(12) United States Patent
Mehas et al.

(10) Patent No.: US 8,638,532 B2
(45) Date of Patent: *Jan. 28, 2014

(54) SYSTEM AND METHOD FOR PROGRAMMING AND CONTROLLING OVER CURRENT TRIP POINT LIMITS IN VOLTAGE REGULATORS

(75) Inventors: Gustavo James Mehas, Sunnyvale, CA (US); Atul Wokhlu, Sunnyvale, CA (US); Naveen Jain, Haryana (IN); Xiaole Chen, San Jose, CA (US)

(73) Assignee: Intersil Americas LLC, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/532,084

(22) Filed: Jun. 25, 2012

(65) Prior Publication Data

US 2012/0257312 A1    Oct. 11, 2012

Related U.S. Application Data

(63) Continuation of application No. 12/032,328, filed on Feb. 15, 2008, now Pat. No. 8,233,256.

(60) Provisional application No. 60/890,286, filed on Feb. 16, 2007.

(51) Int. Cl.
*H02H 7/00* (2006.01)
*H02H 9/00* (2006.01)

(52) U.S. Cl.
USPC ........................................................ 361/18

(58) Field of Classification Search
None
See application file for complete search history.

(56) References Cited

U.S. PATENT DOCUMENTS

| 5,635,863 | A | 6/1997 | Price, Jr. |
| 6,335,577 | B1 | 1/2002 | Baba |
| 6,700,365 | B2 | 3/2004 | Isham et al. |
| 6,850,398 | B2 | 2/2005 | Ciancio |
| 6,867,573 | B1 | 3/2005 | Carper |
| 7,132,765 | B2 | 11/2006 | Premont et al. |
| 7,332,358 | B2 | 2/2008 | Orr |
| 7,489,186 | B2 | 2/2009 | Segarra |
| 8,233,256 | B2 * | 7/2012 | Mehas et al. ................. 361/93.2 |
| 2006/0114624 | A1 | 6/2006 | Sharma |
| 2007/0236420 | A1 | 10/2007 | Huang et al. |
| 2008/0036526 | A1 | 2/2008 | Wu et al. |

* cited by examiner

*Primary Examiner* — Dharti Patel
(74) *Attorney, Agent, or Firm* — Paul A. Bernkopf; Graybeal Jackson LLP; Bryan A. Santarelli

(57) ABSTRACT

A system and method for controlling an over current protection trip point for a voltage regulator includes an input for receiving a monitored operating parameter of the voltage regulator. Control logic responsive to this input generates a digital current control signal. A digital to analog controller converts the digital current control signal to an analog current control signal and this analog current control signal is used for controlling a current source for generating a current that establishes the over current protection trip point of the voltage regulator.

20 Claims, 8 Drawing Sheets

(PRIOR ART PERFORMANCE)

SYSTEM AND METHOD FOR PROGRAMMING AND CONTROLLING OVER CURRENT TRIP POINT LIMITS IN VOLTAGE REGULATORS

CROSS-REFERENCE TO RELATED APPLICATIONS

This application is a continuation of U.S. patent application Ser. No. 12/032,328, filed Feb. 15, 2008, entitled SYSTEM AND METHOD FOR PROGRAMMING AND CONTROLLING OVER CURRENT TRIP POINT LIMITS IN VOLTAGE REGULATORS which claims benefit of U.S. Provisional Application No. 60/890,286, filed Feb. 16, 2007, entitled METHOD FOR PROGRAMMING AND CONTROLLING OVER CURRENT TRIP POINT LIMITS IN VOLTAGE REGULATORS, the specifications of which are incorporated herein in their entirety.

TECHNICAL FIELD

The present invention relates to voltage regulators, and more particularly, to a system and method for programming and controlling over current trip point limits within a voltage regulator.

BACKGROUND

The desire to increase the accuracy of over current protection (OCP) trip points has become of increased importance within the semiconductor industry. OCP measurement accuracy has advanced to the point where circuit offsets are no longer the dominant factor in the OCP error stack up. Even with improvements to OCP performance, it is still not acceptable to many users who find that existing OCP solutions have significant variations and are only usable for short current protection.

The difference between a design with over current protection and a design with short current protection is important. In a design with over current protection, all critical specifications are met up to the point the regulator detects an over current event. One critical specification in this regard is the maximum operating temperature of the voltage regulator. If an OCP trip point accuracy varies between 11 amps and 18 amps as illustrated in FIG. 1, the voltage regulator would be rated for a 10 amp load yet it must be designed so that it can safely operate at 18 amps without a thermal failure. Other failure modes, such as inductor saturation, also must be designed for the higher current level. This requires a designer to build extra margin and cost into their designs. As a result, users see an increase in over current protection accuracy as a real method to reduce their costs.

One present solution to this problem is for users to simply state that they have short current protection, where protection is only provided for low impedance shorts that are detected before a thermal failure occurs. While this works at times for low impedance shorts, intermediate shorts will not be detected prior to the regulator failing from thermal overstress. There is a school of thought which believes that voltage regulators experiencing thermal overstress will increase their temperature and will naturally lower their OCP trip points. FIG. 1 illustrates tests in this manner to exploit this, and even with this affect, a substantial variation in OCP trip points over temperature can be seen.

Prior art voltage regulators use a fixed current source through a fixed resistor to program the over current protection limit. In these cases, there is a large variation on the OCP trip point as a function of input voltage and ambient temperature (see FIG. 1). Additional prior art implementations use a programmable resistor whose values change with temperature to compensate the OCP trip point. These designs typically utilize an NTC or PTC thermistor as appropriate. These solutions have not obtained wide industry acceptance as external thermistors are expensive and their temperature characteristics do not perfectly match the OCP trip point temperature variations for which they are compensating. The solutions also do not compensate for other factors that affect the OCP trip point.

Thus, there is a need for a voltage regulator with a constant OCP threshold as a function of temperature, input voltage and gate voltage. These variables are considered significant first and second order causes for variation in the OCP trip point.

SUMMARY

The present invention, as disclosed and described herein, in one aspect thereof, comprises a system and method for controlling an over current trip protection point of a voltage regulator. Control logic generates a digital current control signal responsive to at least one monitored operating parameter of the voltage regulator. This monitored operating parameter is received via a first input connected with the control logic. A digital to analog converter generates an analog control signal from the digital control signal and this analog control signal is used for controlling a current source that generates a current to establish the over current protection trip point of the voltage regulator.

BRIEF DESCRIPTION OF THE DRAWINGS

For a more complete understanding, reference is now made to the following description taken in conjunction with the accompanying Drawings in which.

DETAILED DESCRIPTION

Figure 1:
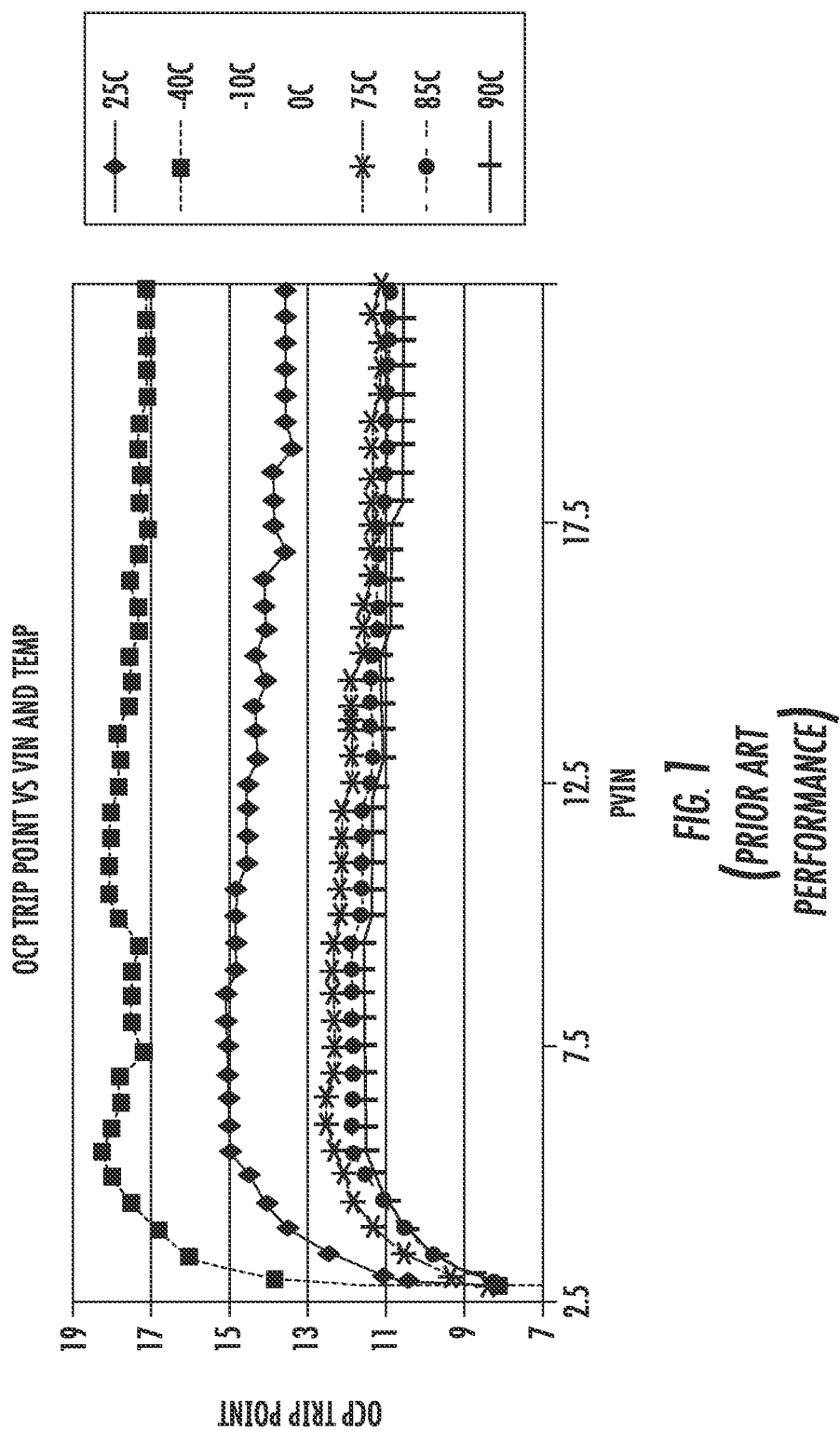
FIG. 1 illustrates the OCP trip point versus input voltage at various temperatures for prior art embodiments.

Referring now to the drawings, wherein like reference numbers are used herein to designate like elements throughout the various views, embodiments of the present invention are illustrated and described, and other possible embodiments of the present invention are described. The figures are not necessarily drawn to scale, and in some instances the drawings have been exaggerated and/or simplified in places for illustrative purposes only. One of ordinary skill in the art will appreciate the many possible applications and variations of the present invention based on the following examples of possible embodiments of the present invention.

Figure 2:
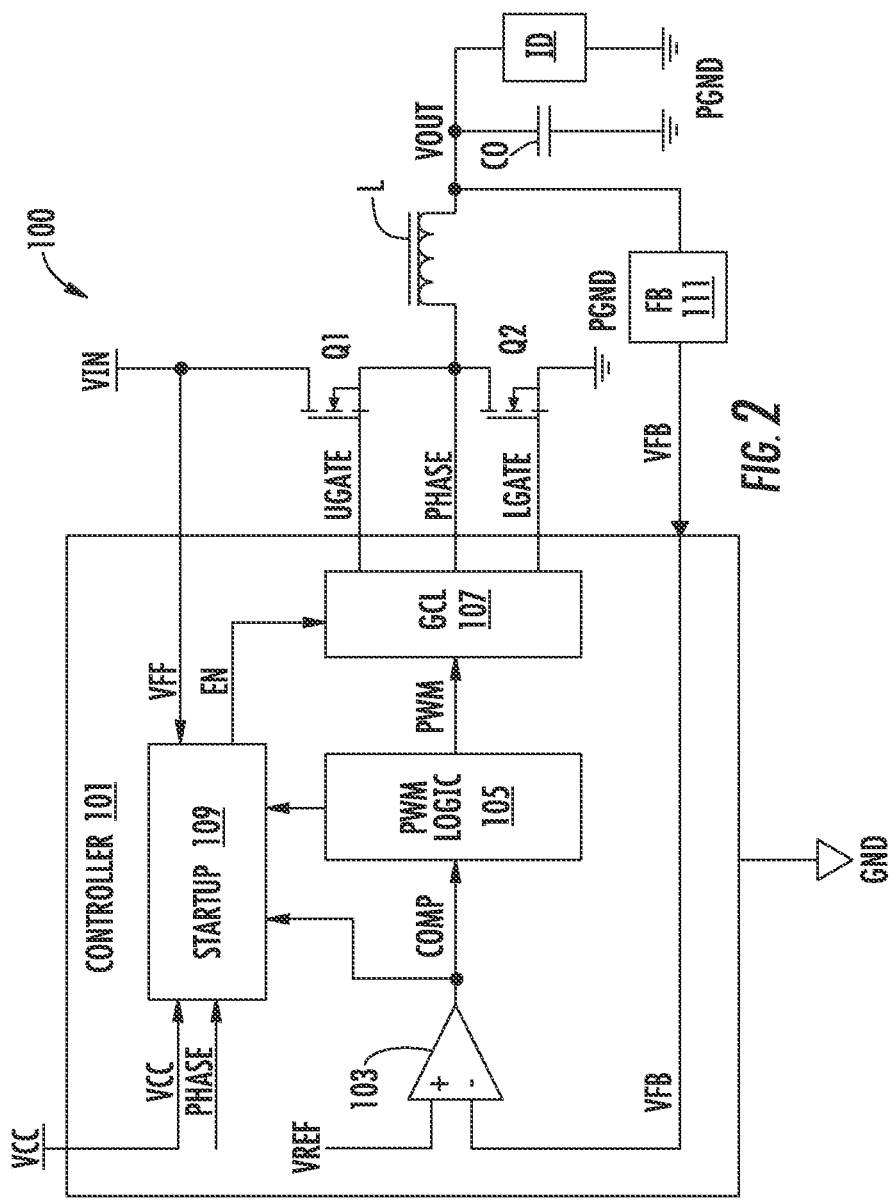
FIG. 2 is a block diagram of a DC/DC converter.

FIG. 2 is a simplified schematic and block diagram of a DC to DC converter 100. The DC to DC converter 100 is shown as a buck type converter for purposes of illustration, although it is understood that the present invention is equally applicable to other types of power converters. A pair of switches, Q1 and Q2, are coupled in series between respective terminals of an input source voltage, shown as VIN, and power ground (PGND). In the embodiment shown, the switches Q1 and Q2 are implemented in channel metal oxide semiconductor, field effect transistors (MOSFETs), although other types of electronic switches are contemplated including semiconductor switches suitable for integrated circuit (IC) fabrication. The upper switch Q1 has its drain coupled to VIN, its gate receiving an upper gate control signal UGATE, and its source coupled to the drain of the lower switch Q2 at a node PHASE developing a PHASE signal. A node and the signal it develops are referred to herein as the same unless otherwise specified. The lower switch Q2 having its drain coupled to PHASE, receives a lower gate control signal LGATE at its gate and has its source coupled to PGND. The PHASE node is coupled through an output inductor L to an output node that develops an output signal VOUT. The VOUT signal is applied to a load LD and an output capacitor CO both referenced to ground. The VOUT signal is fed back through a feedback (FB) circuit 111 as a feedback voltage signal (VFB) to a controller 101, which outputs the UGATE and LGATE signals to control operation of switches Q1 and Q2. The PHASE node is also provided to the controller 101 for various purposes, including over current detection.

The controller 101 includes an error amplifier 103, PWM logic 105, gate control logic (GCL) 107 and the startup circuit 109. In typical configurations, the error amplifier 103 senses VOUT via the VFB signal or a voltage sensed signal (not shown) or other means, and generates a compensation signal COMP provided at its output to the PWM logic 105. As shown, VFB is provided to the inverting input of the error amplifier 103 within the controller 101, although alternative methods are contemplated for sensing the output. The PWM logic 105 includes an oscillator or the like (not shown) which generates a reference oscillation waveform and a PWM comparator which compares the reference wave form with the COMP signal to generate a PWM wave form provided to the GCL 107. Based on the PWM signal, the GCL 107 asserts the UGATE signal high to turn on the switch Q1 and asserts the LGATE signal low to turn off the switch Q2 to couple VIN through the output inductor L to drive the voltage level of VOUT. The GCL 107 then asserts the UGATE signal low and the LGATE signal high to turn off Q1 and turn on Q2. Operation toggles in this manner based on the duty cycle of the PWM signal.

A typical startup sequence is to ramp the reference signal provided to the non-inverting input of the error amplifier 103 from zero to a set point voltage level. If VOUT is already pre-charged, such as by the load LD or by the DC to DC converters, the VFB signal is already high and the error amplifier 103 pulls COMP low. The PWM logic responds by producing the PWM signal at a relatively low duty cycle causing the GCL 107 to activate the lower switch Q2 for a substantial period of time in an attempt to reduce VOUT. Thus, the switch Q2 is coupled between ground and the pre-charged VOUT signal through the inductor L for a sufficiently long enough period of time, potentially exceeding its thermal limit. In general, if the average voltage across the inductor L is not zero, surge currents are generated which potentially cause damage to the DC to DC converter 100 (e.g., the switch Q2) or to components in the load LD.

The GCL 107 includes a pair of output drivers (not shown) that drive the gates of the switches Q1 and Q2 based on the PWM signal as known to those skilled in the art. Also, the GCL 107 typically includes shoot through protection logic or the like that ensures only one of the switches Q1 and Q2 is on at any given time. When the enable signal is asserted high, the GCL operates as normal and when the enable signal is asserted low, the GCL turns both of the switches Q1 and Q2 off to disable output switching. In one embodiment, for example, the GCL 107 disables both the output drivers so that the UGATE and LGATE signals are both asserted low and remain low while the enable signal is asserted low. Internal and external embodiments of the GCL 107 are contemplated. An external gate driver IC, for example, may be configured with an enable input that receives the enable signal or a version thereof. In some embodiments, the GCL 107 tri states its outputs in response to the enable signal going low and a separate driver IC (not shown) incorporating the switches Q1 and Q2 detects the tri state condition and disables itself. The present invention is not limited to any specific embodiment or configuration of the GCL 107 or the switching devices. While a single phase converter is described, multiphase converters may also be utilized.

Figure 3:
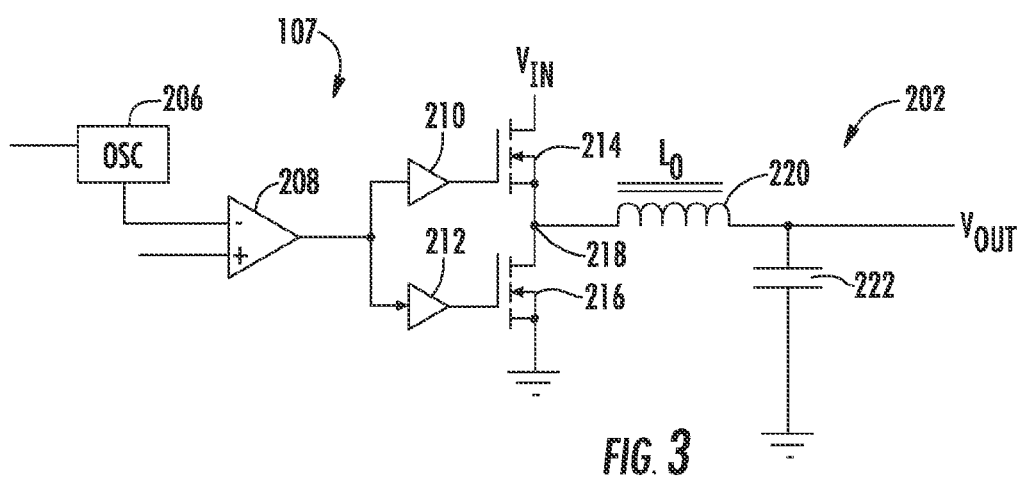
FIG. 3 is a schematic block diagram of a voltage regulator with a PWM converter circuit.

Referring now to FIG. 3, there is illustrated a buck converter regulator with included PWM logic 105 and gate control logic 107 as discussed in FIG. 2. PWM comparator 208 has the output of the error amplifier 103 applied to its positive input and its negative input connected to receive an input from oscillator 206. The output of the oscillator 206 is a triangular wave form. The output of the PWM comparator 208 is applied to driver circuits 210 and 212 within the GCL circuitry 107, which drive the gates of the transistors 214 and 216 respectively. This circuitry provides a pulse width modulated wave form with an amplitude of $V_{in}$ at a PHASE node 218 connected to a first side of inductor 220. The PWM wave form provided from PHASE node 218 is smoothed by an output filter consisting of inductor 220 and capacitor 222. The FB pin impedance 111 comprises a compensation feed back loop for the error amplifier 103.

Figure 4:
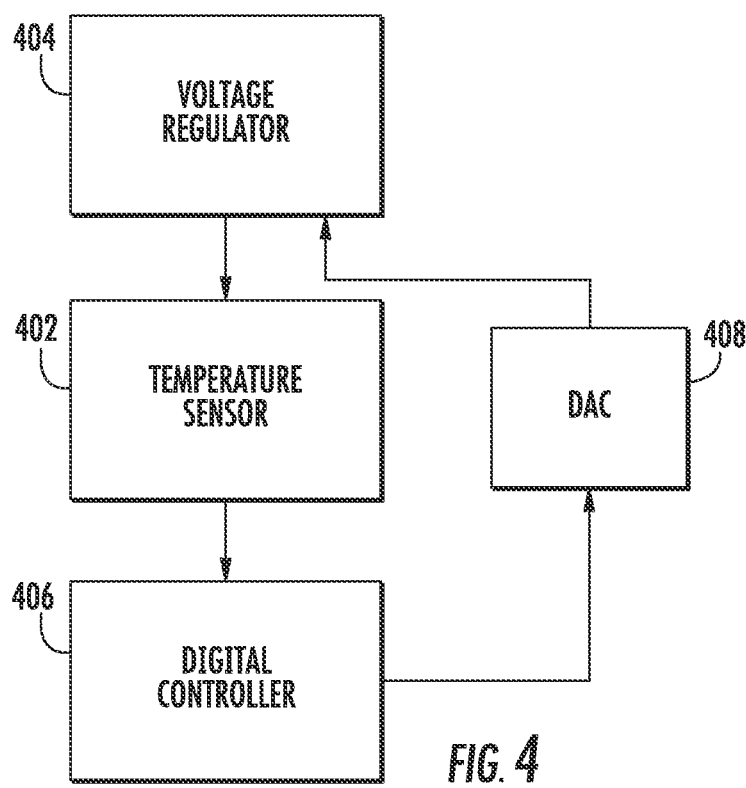
FIG. 4 is a block diagram of a voltage regulator including control circuitry for adjusting the OCP trip point responsive to temperature.
Figure 5:
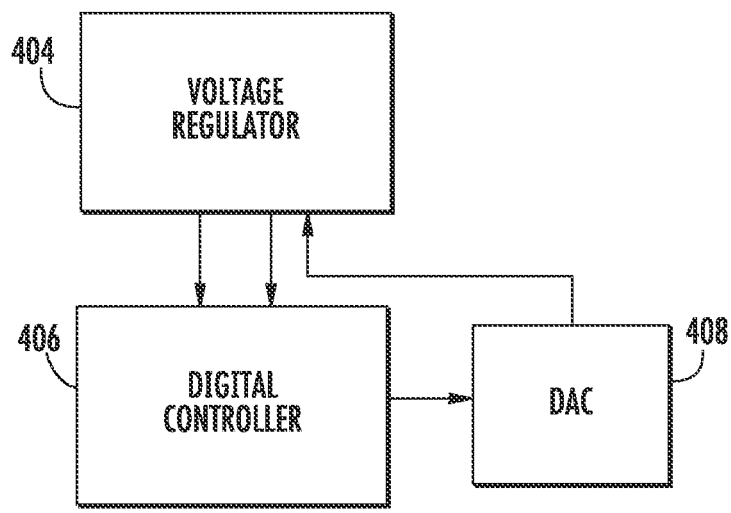
FIG. 5 illustrates a voltage regulator for controlling the OCP trip point responsive to various parameters which may also include the temperature.

The present system as illustrated in FIGS. 4 and 5 uses operating parameters of the voltage regulator to compensate the over current protection trip point of a voltage regulator. Referring now more particularly to FIG. 4, a temperature sensor 402 is located proximal to a MOSFET switching transistor within the voltage regulator 404 to enable monitoring of the temperature of the MOSFET switching transistor. The information from the temperature sensor 402 is provided to a digital controller 406 which generates control signals to adjust a digital to analog controller (DAC) 408 The DAC 408 may comprise a current output DAC or a voltage output DAC. The digital controller 406 and the DAC 408 set the OCP trip point within the voltage regulator 404 so that the OCP trip point is constant over the various temperatures detected by the temperature sensor 402. Thus, the OCP trip point is constantly altered responsive to temperature indications provided by the temperature sensor enabling the provision of a constant trip point.

Referring now also to FIG. 5, there is illustrated an embodiment wherein the voltage regulator 404 provides a plurality of sensed data signals to the digital controller 406 such as temperature, input voltage, gate voltage, etc. that may be used by the digital controller 404 to provide control signals to the DAC 408. The DAC 408 may comprise a current output DAC or a voltage output DAC. Responsive to these sensed operating parameter inputs of the voltage regulator 404, the DAC 408 may dynamically control the OCP trip point of the voltage regulator 404 to provide a constant trip point over varying circuit conditions. For example, when using MOSFET RDSON for OCP monitoring, the MOSFET switch gate and source voltage can be monitored allowing the circuitry to compensate the OCP trip point for variations in MOSFET RDSON as the gate to source voltage Vgs changes. Additionally, the input voltage can be monitored and used to compensate for variations in the OCP trip point. Other variables can of course be monitored and compensated for as well as would be well understood by one skilled in the art.

Figure 6:
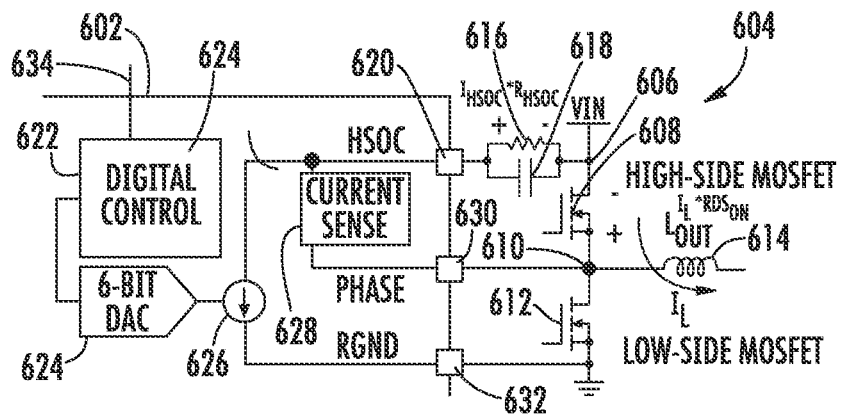
FIG. 6 illustrates a first embodiment for controlling the over current trip point of a voltage regulator.
Figure 7:
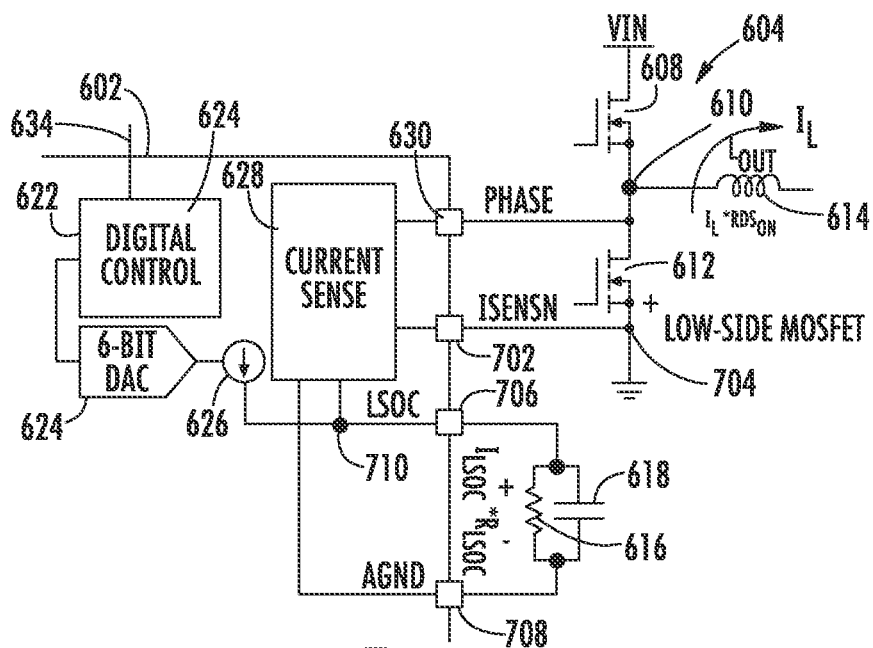
FIG. 7 is a further embodiment of a circuit for controlling the over current trip point in a voltage regulator using MOSFET RDSON for current sense.
Figure 8:
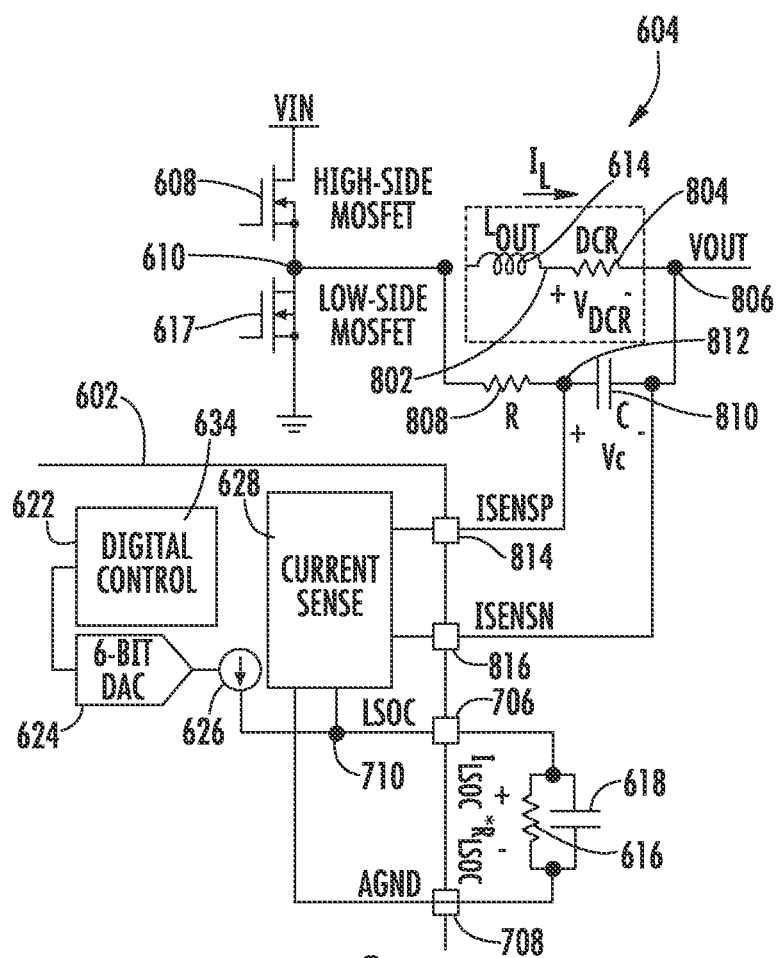
FIG. 8 illustrates yet a further embodiment of a circuit for controlling the over current trip point in a voltage regulator using inductor DCR as a current sense element.

Referring now to FIGS. 6-8, there are illustrated various embodiments by which an integrated circuit 602 may be interconnected with the voltage regulator 604 to enable controlling of the over current protection trip point within the voltage regulator 604. As can be seen from the implementation in FIG. 6, IC controller 602 is connected across the high-side MOSFET 608 and the low-side of MOSFET 612 to the input voltage node 606 the phase node 610 and the ground nodes respectively. In FIG. 6, the input voltage VIN is applied to the voltage regulator 604 at node 606. High-side MOSFET switching transistor 608 has its drain/source path connected between node 606 and the phase node 610 and the other end connected to the output voltage modes. The low-side MOSFET switching transistor 612 is connected between the phase node 610 and ground. An inductor 614 through which the load current IL passes has one end connected to the phase node 610. A resistor 616 and a capacitor 618 are connected in parallel between node 606 and the input pin HSOC 620 of the integrated circuit 602. The over current threshold is generated at the HSOC 620.

The resistor 616 in parallel with the capacitor 618 provides several benefits to this implementation. Since the capacitor voltage is equal to the voltage draw across the resistor 616, any change in the load current IL will have an RC settling time which in turn allows for added control, using the value of the resistor 616 and the capacitor 618, on the bandwidth of the temperature compensating mechanism outside of the control algorithm provided by a digital controller 622 within the IC 602. The capacitor 618 also provides a fundamental method to smooth over current protection threshold variations and nonlinearities introduced within the switches of the digital to analog controller (DAC) 624, which may typically have 6 bit resolution; however, other resolutions may be used, controlled by the digital controller 622. This simplifies the design of the digital to analog controller 624 and the control complexity. The capacitor 618 also allows the use of a switched capacitor comparator design inside of the integrated circuit 602 as the capacitor 618 provides the necessary filtering these types of circuits require. Finally, the capacitor 618 is used as a high pass filter to allow the input voltage steps (due to the ESR in the input bulk decoupling capacitors) to be passed to the HSOC pin 620, which would otherwise cause offsets and thus errors in the measurements.

Within the integrated circuit 602 in addition to the digital controller 622 and 6-bit DAC 624 are included a current sink 626 and a current sense circuit 628. The current sense circuit 628 generates an output signal that is provided to the PWM controller 101 (FIG. 2) that is used to turn off the MOSFETS 608 AND 612 if the current on one MOSFET is higher than the OCP threshold. The current sense circuit 628 is connected between the HSOC pin 620 and the phase pin 630. External to the IC 602 the phase pin 630 is connected to the phase node 610 of the voltage regulator 604. The current sink 626 is connected between the HSOC pin 620 and the ground pin 632. The sink current source 626 is controlled by the 6-bit digital to analog converter 624 which assists in establishing the OCP trip point responsive to control signals provided from the digital controller 622. The digital controller 622 would include various inputs 634 for receiving sensor data such as temperature, gate to source voltage, input voltage, etc., to enable establishment of the constant trip point. Thus, the OCP trip point levels will be controlled by the digital controller 622 responsive to the monitored sensor data provided at input 634. The digital controller 622 programs the 6-bit DAC 624 to establish a DAC current 626 to establish the desired trip point. In alternative embodiments the DAC 624 can also be used to establish a DAC voltage. The current sensor 628 measures a voltage drop across high side MOSFET 608. This is used to determine the current through the high side MOSFET 608.

The design of the 6-bit (DAC) 624 requires several factors to be taken into account. A 100 microamp nominal level is used as a reference in this implementation. Fundamentally, the DAC 624 must have a sufficient range to provide for all the variations that will be compensated for in then voltage regulator, and the DAC 624 should provide good granularity throughout this range. The DAC 624 range should be able to compensate for the thermal variation of RDSON in each MOSFET. Over the industrial temperature range, this equates to a +/−40% variation, or a range of 60 microamps to 140 microamps. Additionally, part to part variation does occur from MOSFET vendors, and as such, additional margin has been built into the DAC 624 range to allow for set point trimming should a user wish to eliminate this source of error. In the implementation of FIG. 6, the DAC range is 50 microamps to approximately 197.7 microamps. Alternatively, an equivalent voltage range can be provided. This provides approximately 17 point set point adjustment on top of the 40% variation.

The step size of the digital to analog controller 624 can also be varied by the digital controller 622. In a non-linear DAC where each step is a fixed percentage greater than the last minimized set point error, this can cause other difficulties not the least of which is the impact on the algorithm that must choose what DAC code to use for a given temperature. To ease algorithmic design and the fundamental DAC design, a 6-bit linear DAC is utilized in one embodiment. This provides for lower accuracy at low currents as compared to higher currents. However, the implemented performance is considered acceptable. One reason is that the above thermal augment which is insufficient for overall protection can be applied in a reduced extent to enable the operation of the circuit to be biased towards higher temperatures equating to higher RDSONs, and thus indicating that the most accuracy would be beneficial at higher DAC current values. In the implementation of FIG. 6, the DAC ranges from 50 microamps to 197.7 microamps with an LSB with approximately 2.3 microamps.

An additional implementation would monitor the gate to source voltage of the MOSFET 608 to allow for variations in RDSON due to this variable. Since the RDSON value depends on both the temperature of the MOSFET as well as its gate to source voltage, the gate to source voltage can be measured either directly or by monitoring the MOSFET gate driver supply voltage and may then apply a correction on the over current limit voltage using a DAC. Additionally, the monitored input voltage could be used to compensate the OCP threshold.

Referring now to FIG. 7, there is illustrated an alternative embodiment wherein the trip point controller IC 602 is connected to the voltage regulator 604 in a different configuration. In this case, the IC controller 602 has a phase pin 630 connected to the phase node 610 of the voltage regulator 604. An ISENSN pin 702 is connected to node 704 of the low-side MOSFET 612 at the ground node. The controller 602 also includes a low-side over current pin (LSOC) 706 and a ground pin 708 and perform similar functions as described previously. The over current threshold is generated at the LSOC 706. The parallel combination of the resistor 616 and the capacitor 618 are connected between the LSOC pin 706 and the ground pin 708. The digital controller 622 still programs the DAC 624 responsive to received input operating parameter signals from the voltage regulator 604. The DAC 624 controls the current source 626 which provides a current to the LSOC pin 706 through node 710. Alternatively, as discussed previously, a voltage source could be controlled. The current sensing circuit 608 is connected to the phase pin 630, ISENSN 702, ground pin 708 and LSOC pin 706 through node 710 to sense the current of the voltage regulator 604 passing through low-side MOSFET 612. The current is determined based upon a voltage drop across the low-side MOSFET 612. The voltage regulator 604 consists of the high-side MOSFET switching transistor 608 connected between the input voltage VIN and node 610; the low-side switching MOSFET transistor 612 connected between the phase node 610 and the ground node 704 and an inductor 614 having one end connected to the phase node 610.

Referring now also to FIG. 8, there is illustrated yet a third embodiment of the manner for interconnecting the over current trip point controller IC 602 with the voltage regulator 604. The voltage regulator 604 consists of the high-side MOSFET 608 connected between the input voltage VIN and the phase node 610. The low-side switching transistor MOSFET 612 is connected between node 610 and ground. The inductor 614 is connected between the phase node 610 and node 802. Resistor 804 is connected between node 802 and the output voltage node 806 of the voltage regulator 604. A resistor 808 and a capacitor 810 are connected in series between the phase node 610 and the output voltage node 806. The resistor 808 is connected between the phase node 610 and node 812. The capacitor 810 is connected between node 812 and the output voltage node 806. The over current protection IC 602 is connected with the voltage regulator 604 through nodes 812 and the output voltage node 806. An ISENSP pin 814 connects to node 812. An ISENSN pin 816 connects to the output voltage node 806. The parallel combination of the resistor 616 and capacitor 618 are connected in parallel between the LSOC node 706 and the ground node 708 to perform the functions described previously. The over current threshold is generated at the LSOC 706. The digital controller 622 receives monitored parameters from the voltage regulator 604 via pin 634 as described previously and generates control signals to the DAC 624. The DAC 624 controls a source current 626 which is provided to the LSOC pin 706. A current sensed circuit 628 detects the current through the inductor 614 based on the voltage drop across the inductor and is connected to the ISENSP pin 814, ISENSN pin 816, the ground pin 708 and the LSOC pin 706 through node 710. The RC circuit consisting of resistor 616 and capacitor 618 in addition to being connected to ground may also be connected to $V_{out}$ in an alternative embodiment.

Figure 9:
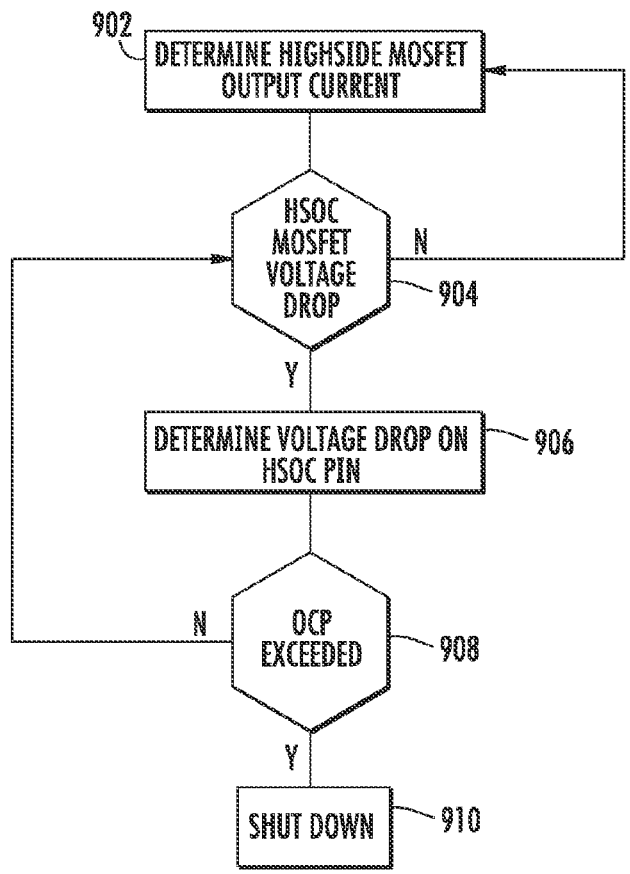
FIG. 9 is a flow diagram describing the operation of an over protection current IC using RDSON of high side MOSFET.

Referring now to FIG. 9, there is illustrated a flow diagram describing the operation of the over current protection IC 602. Initially a determination is made of the high-side MOSFET output current at step 902. Next, inquiry step 904 determines if the voltage drop is occurring on the high-side MOSFET. If not, control passes back to step 902. If a voltage drop is occurring on the high-side MOSFET, the voltage drop on the HSOC pin is determined at step 906. Based upon the voltage at the HSOC pin inquiry step 908 determines if the over current protection threshold limit has been exceeded. If not, control passes back to step 904. If inquiry step 908 determines that the over current protection threshold limit has been exceeded the regulator is shut down at step 910.

Figure 10:
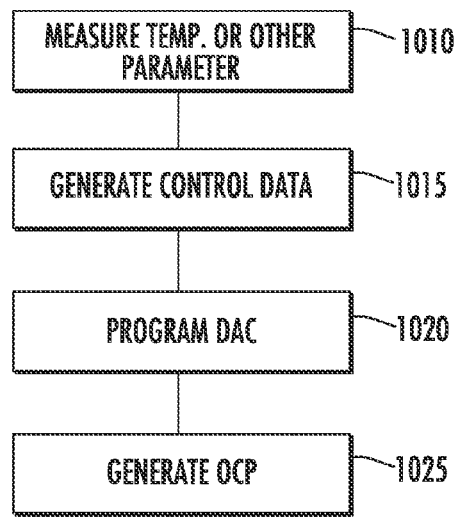
FIG. 10 is a flow diagram illustrating the manner for establishing the over current protection threshold.

FIG. 10 is a flow diagram illustrating the manner in which the over current protection IC 602 establishes the over current protection threshold. At step 1010, the temperature associated with the MOSFET RDSON or other parameters such as the gate voltage are measured. Next, this measured temperature or parameter information is used to generate control data at step 1015 within the digital control circuit 622 of the IC 602. This digital control information is used to program the digital to analog converter 624 at step 1020. The output of the digital to analog controller is then used to control the generation of the over current protection limit at step 1025.

Figure 11:
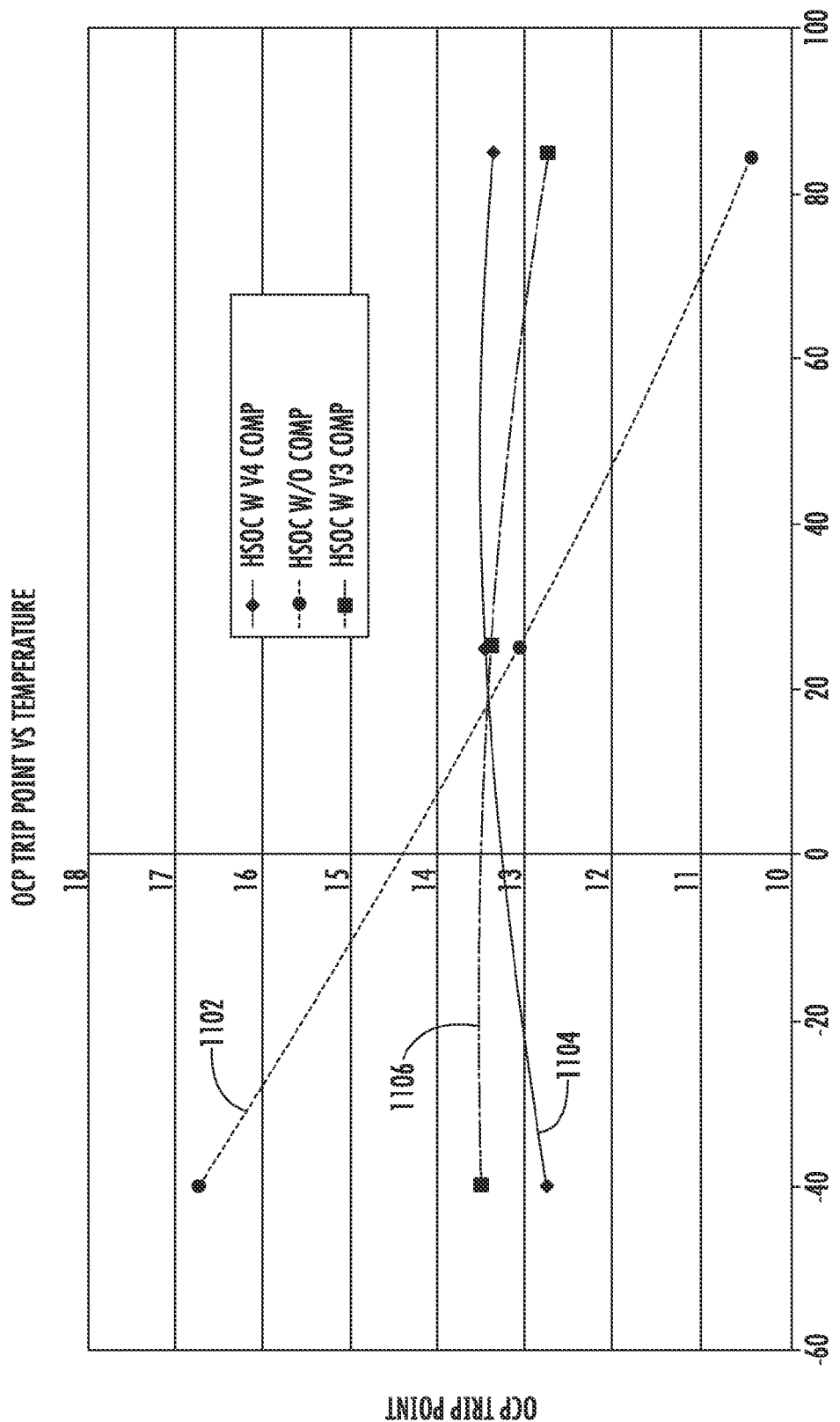
FIG. 11 is a chart illustrating the over current protection trip point vs. temperature for high side over current with and without compensation.

Referring now to FIG. 11, there is illustrated a chart describing the over current protection (OCP) trip point versus temperature for high-side over current without compensation as illustrated by line 1102. As can be seen, without the compensation of the over current trip point there is a wide variation over temperature from minus 40 degrees to above 80 degrees. When compensation of the V4 type is used as illustrated at 1104, the amount of variation in the OCP trip point is greatly minimized. Likewise, when high-side over current limits with V3 compensation as illustrated generally 1106 are used, the variations in the OCP trip point are again limited. Thus, the use of the described implementation provides a dramatic improvement in OCP accuracy. At present, OCP accuracy can vary up to 50% due to temperature factors alone as illustrated by 1102 in FIG. 11. This methodology significantly improves accuracy by compensating for this error resulting in improvements such as those illustrated at 1104 and 1106. Additionally, the methodology can be extended to compensate for other parameters that affect the OCP trip point accuracy such as MOSFET gate to source voltage and input voltage variations.

It will be appreciated by those skilled in the art having the benefit of this disclosure that this invention provides an improved system and method of setting an over current protection trip point. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. An apparatus for dynamically controlling an over current protection trip point for a voltage regulator, comprising:
   a first input for receiving monitored changes in at least one operating parameter other than an output voltage of the voltage regulator;
   a digital controller for generating a digital control signal to set the over current protection trip point at a substantially constant level responsive to the changes in the at least one operating parameter of the voltage regulator, the over current protection trip point establishing a point for disabling at least one power switch of the voltage regulator when a measured value indicative of a load current of the voltage regulator exceeds the over current protection trip point; and a digital to analog converter for generating an analog control signal to set the over current protection trip point at the substantially constant level responsive to the digital control signal.

2. The apparatus of claim 1, further including a current sensor for measuring a current through a portion of the voltage regulator.

3. The apparatus of claim 2, further including an RC circuit associated with the current sensor for providing additional bandwidth control of the apparatus.

4. The apparatus of claim 2, further including an RC circuit associated with the current sensor for smoothing over current protection trip point variations introduced by switching of the digital to analog converter.

5. The apparatus of claim 2, further including an RC circuit associated with the current sensor for providing high pass filtering.

6. The apparatus of claim 1, wherein the at least one operating parameter comprises a temperature related to a switching transistor of the voltage regulator.

7. The apparatus of claim 1, wherein the at least one operating parameter comprises a gate to source voltage of a switching transistor while the switching transistor is turned on of the voltage regulator.

8. The apparatus of claim 1, wherein the at least one operating parameter comprises an input voltage of the voltage regulator.

9. The apparatus of claim 1, further including a current source responsive to the analog control signal for establishing the over current protection trip point, further wherein the over current protection trip point established by the current source remains substantially constant over variations in the at least one operating parameter.

10. A system comprising:
a voltage regulator for generating a regulated output voltage responsive to an input voltage, the voltage regulator including at least one switching transistor;
an integrated circuit for maintaining an over current protection trip point at a substantially constant level for the voltage regulator, responsive to changes in at least one monitored parameter of the voltage regulator, the integrated circuit further including:
a digital controller for generating a digital control signal to set the over current protection trip point at a substantially constant level responsive to the changes in the at least one operating parameter of the voltage regulator, the over current protection trip point establishing a point for disabling at least one power switch of the voltage regulator when a measured value indicative of a load current of the voltage regulator exceeds the over current protection trip point;
a digital to analog converter for generating an analog control signal to set the over current protection trip point at the substantially constant level responsive to the digital control signal; and a current source responsive to the analog control signal for establishing the over current protection trip point, further wherein the over current protection trip point established by the current source remains substantially constant over variations in the operating parameter.

11. The system of claim 10, wherein the at least one monitored parameter comprises a temperature related to at least one of the high-side switching transistor and the low-side switching transistor.

12. The system of claim 10, wherein the at least one monitored parameter comprises a monitored gate to source voltage of at least one of the high-side switching transistor and the low-side switching transistor.

13. The system of claim 10, wherein the at least one monitored parameter comprises an input voltage of the voltage regulator.

14. The system of claim 10, further including an RC circuit associated with a current sensor.

15. A method for controlling a variable over current protection trip point of a voltage regulator, comprising the steps of:
monitoring at least one operating parameter other than an output voltage of the voltage regulator;
generating a digital current control signal responsive to the at least one monitored parameter of the voltage regulator;
converting the digital current control signal to an analog control signal; and
generating the over current protection trip point at a substantially constant level responsive to the analog control signal, the over current protection trip point establishing a point for disabling at least one power switch of the voltage regulator when a measured value indicative of a load current of the voltage regulator the over current protection trip point.

16. The method of claim 15, wherein the step of generating the over current protection trip point further includes the steps of:
generating a control current responsive to changes in the analog control signal; and
generating the over current protection trip point responsive to the control current,
wherein the over current protection trip point established by a current source remains substantially constant over variations in the operating parameter.

17. The method of claim 15 further including the step of measuring a current through a portion of the voltage regulator.

18. The method of claim 15, wherein the step of monitoring further comprises the step of monitoring a temperature related to a switching transistor of the voltage regulator.

19. The method of claim 15, wherein the step of monitoring further comprises the step of monitoring a gate to source voltage of a switching transistor of the voltage regulator.

20. The method of claim 15, wherein the step of monitoring further comprises the step of monitoring an input voltage of the voltage regulator.

* * * * *